INVENTOR.
GENUNG L. CLAPPER
BY [signature]
ATTORNEY

INVENTOR.
GENUNG L. CLAPPER
BY [signature]
ATTORNEY

INVENTOR.
GENUNG L. CLAPPER
BY
ATTORNEY

INVENTOR.
GENUNG L. CLAPPER
BY [signature]
ATTORNEY

INVENTOR.
GENUNG L. CLAPPER
BY [signature]
ATTORNEY

United States Patent Office 3,297,993
Patented Jan. 10, 1967

3,297,993

APPARATUS FOR GENERATING INFORMATION REGARDING THE SPATIAL DISTRIBUTION OF A FUNCTION

Genung L. Clapper, Vestal, N.Y., assignor to International Business Machines Corporation, New York, N.Y., a corporation of New York Filed Dec. 19, 1963, Ser. No. 331,682
14 Claims. (Cl. 340—146.3)

This invention relates to data processing and, more particularly, to the providing of information regarding the distribution in space of a function, such as a symbol or a pattern.

In the recognition and identification of functions, such as alphabetic and numerical symbols, it is necessary to determine the spatial distribution of the function. This has been accomplished in the past typically by presenting the function to a space defined by a plurality of zones and noting all those "active" zones which are occupied by portions of the function. Such a technique provides information regarding the density of the body of the function. The characterization of a function in terms of its body density or associations of active zones, however, may involve large quantities of information, especially for those functions formed with relatively large bodies, and the handling of such information may require costly procedures.

The present invention recognizes that the distribution of a function in a space may be defined more meaningfully in terms of the edge or boundry of the function rather than the body density. Thus, the distribution of the function may be uniquely characterized by detecting those adjacent zones in the space which are in different states, i.e., by noting those active zones that are adjacent to inactive zones not occupied by portions of the function.

The detection of adjacent zones of different states involves the generation of vector or directional information. In particular, if each active zone in the space is compared separately with each of any number of adjacent surrounding zones, it will be noted that each comparison involves a distinct direction. Not only is directional information provided, but each active zone is "expanded" so that a plurality of items of information regarding the zone and its neighbors is developed. The number of such comparisons is arbitrary, and may involve only the four orthogonal directions north, east, south and west, to cite one example.

The use of vector information regarding active zones in a space lends itself to the generation of information that is independent of the size of the function as well its position in space. Thus, the invention includes the summing of vectors in the same direction to eleminate the dependence of the information upon the particular zones from which the information is derived. The sums in different directions may be compared with each other to provide output information which may be taken as characterizing the function and which may be used to identify the function from other functions.

When vector information is generated regarding a relatively large number of directions, it may be advantageous to compare each active zone not only with each adjacent zone separately but simultaneously with a plurality of adjacent zones to limit the expansion of information so that it is not needlessly multiplied. A rule may be applied such that for each active zone a vector is drawn to an adjacent inactive zone only if there are two other inactive zones adjacent to the active zone on both sides of the inactive zone. The rule thus limits the number of vectors that may be extended from the active zones, but provides sufficient information to adequately characterize the function.

The invention also provides for the weighting of the vector information in accordance with the relative positions of the active zones in the space. This increases the sensitivity of the technique and permits closely related functions to be easily distinguished. For example, the numerals 6 and 9 are similarly shaped. These numerals are easily distinguished, however, inasmuch as most of the zones for which the vector information is generated for the numeral 6 are located in a lower portion of a space defined by a plane matrix, while most of the zones involved with vector information for the numeral 9 are located in an upper portion of the matrix. The information derived from the active zones relating to these numerals are thus given different weights.

A more complete understanding of the invention may be obtained by consulting the following detailed description and the appended drawings, in which:

FIG. 1 shows a representative matrix of $$P_{0,0}, P_{1,0} \ldots P_{m,n}$$

zones comprising a space;

GENERAL BACKGROUND

Figure 1:
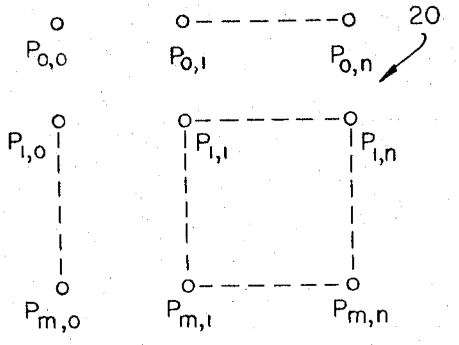

FIG. 1 shows a space 20 defined by a plurality of zones P. The space shown is planar, but this is for the purpose of illustration only, the invention being applicable to spaces of more than two dimensions. The zones P may be of any size and spacing, and are arranged in rows 0, 1 . . . *m* and in columns 0, 1 . . . *n*. For any zone $P_{i,j}$, the first number (*i*) in the subscript designates the row in which the zone is located, and the second number (*j*) designates the column.

Figure 2:
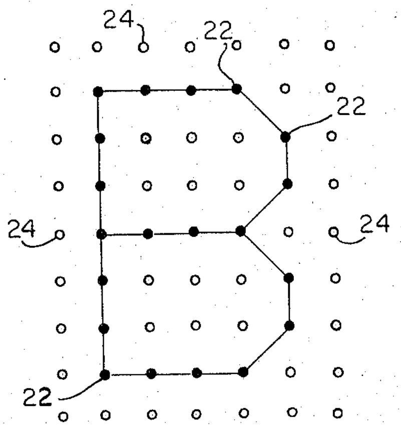
FIG. 2 shows a representative matrix of zones containing the symbol B positioned therein.

FIG. 2 shows a matrix of zones as defined in FIG. 1, formed from nine rows and seven columns. The alphabetic symbol B is shown positioned within the matrix and covers a series of active zones 22, darkened in the figure. Inactive zones 24 are those zones in the matrix which are not covered by the symbol. The designation of active and inactive zones is, of course, completely arbitrary.

ORTHOGONAL SPACE EXPANSION

Figure 3:
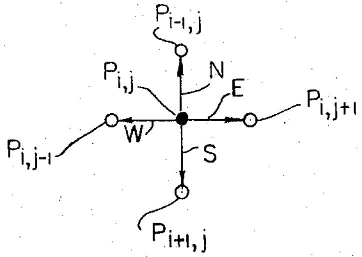
FIG. 3 shows a representative active zone $P_{i,j}$ surrounded by four inactive zones and including orthogonal vectors extending from the active to the adjacent inactive zones.

FIG. 3 shows an active zone $P_{i,j}$ surrounded by inactive zones $P_{i-1,j}$ (to the north of the active zone), $P_{i,j+1}$ (to the east of the active zone), $P_{i+1,j}$ ( to the south of the active zone) and $P_{i,j-1}$ (to the west of the active zone). Four vectors N, E, S and W may be extended, connecting the active zone with the inactive zones. It will be noted that a single zone $P_{i,j}$ may be defined not only by its state (active or inactive), but by its state with respect to the adjacent surrounding zones. Thus each zone, normally characterized by a single bit of information representing its state, may be "expanded" so that it is characterized by four additional bits of information, each bit providing vector or directional information since it relates to the state of the zone with respect to an adjacent zone in a given direction.

This expansion of information using orthogonal vectors is useful in the determination of the spatial distribution of a function, such as a symbol to be recognized. The following rule governs the development of orthogonal vectors:

RULE 1: A vector may be extended in a space from an active zone to an adjacent zone if the adjacent zone is inactive.

Figure 4:
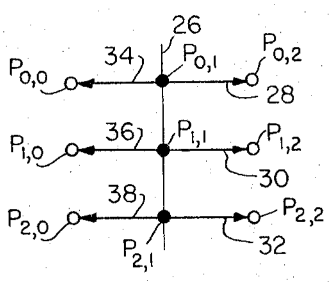
FIG. 4 shows a representative matrix of nine zones in which a line segment is positioned, and including orthogonal vectors extending from active to adjacent inactive zones.

FIG. 4 illustrates Rule 1 applied to a line segment 26 which occupies zones $P_{0,1}$, $P_{1,1}$ and $P_{2,1}$. Vectors 28, 30 and 32 extend easterly from these active zones to inactive zones $P_{0,2}$, $P_{1,2}$ and $P_{2,2}$, respectively. Similarly, vectors 34, 36 and 38 extend westerly from the active zones to the inactive zones $P_{0,0}$, $P_{1,0}$ and $P_{2,0}$, respectively.

Figure 5:
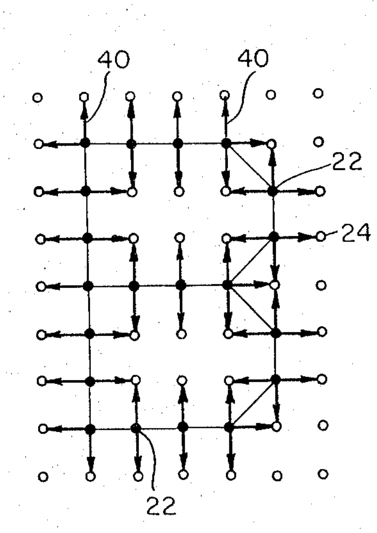
FIG. 5 shows a matrix the same that of FIG. 2 in which the symbol B is positioned, and in which orthogonal vectors extend from active to adjacent inactive zones.

FIG. 5 shows a matrix the same as that in FIG. 2, wherein active zones 22 define the alphabetic symbol B. Orthogonal vectors 40 extend from each active zone 22 to adjacent inactive zones 24. It will be noted that while twenty active zones form the symbol, forty-six vectors extended in accordance with Rule 1 characterize the symbol.

Figure 6:
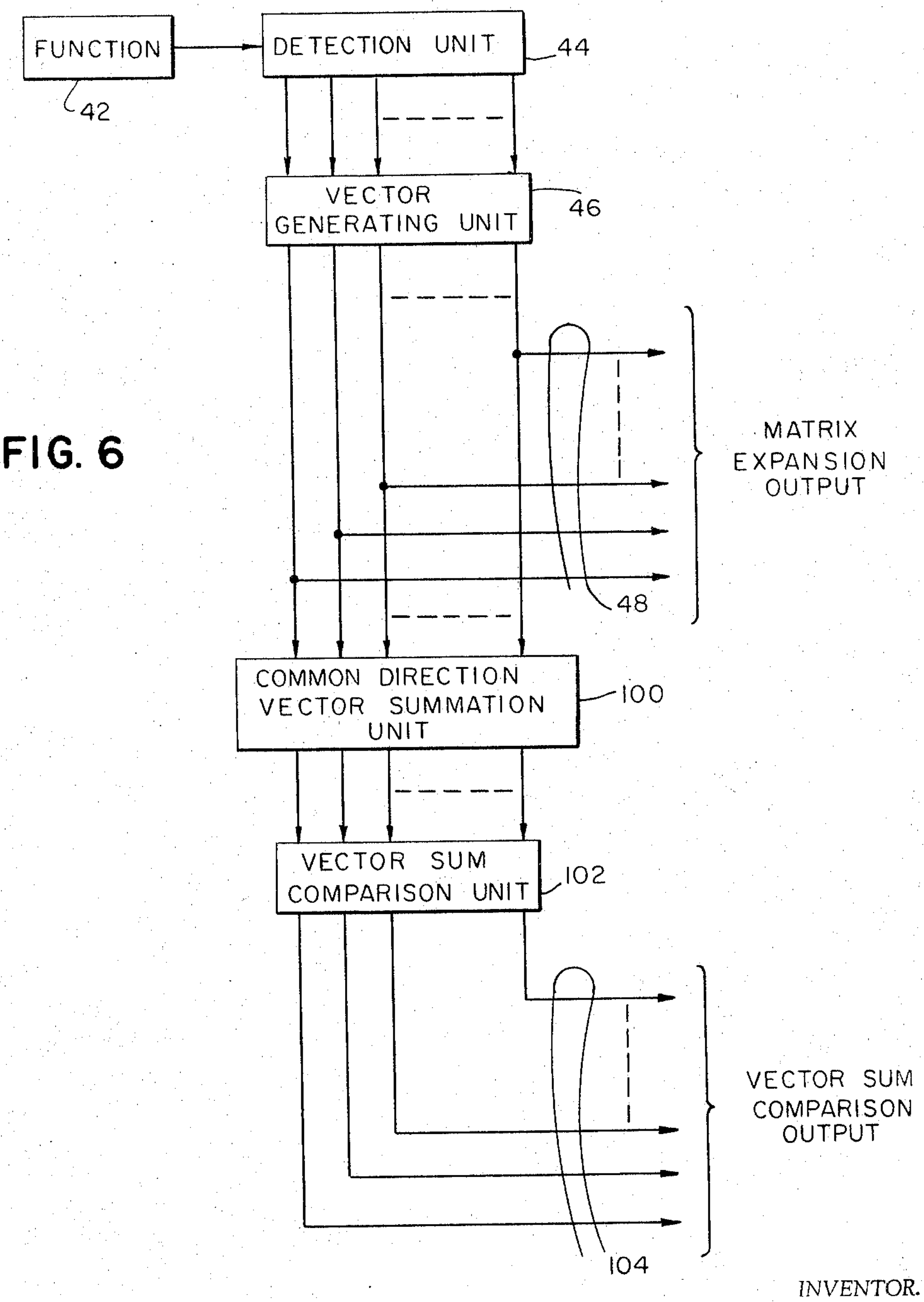
FIG. 6 is a block diagram of a representative system in accordance with the invention.

*Overall system—Rule 1.*—FIG. 6 shows in block diagram form a system suitable for the characterization of symbols and similar functions in accordance with Rule 1 above. A function to be characterized, represented by the block 42 and consisting of a symbol such as B shown in FIG. 5, is applied to a detection unit 44. The detection unit comprises a space defined by a plurality of zones such as the zones $P_{0,0}$, $P_{1,0}$ . . . $P_{m,n}$ of FIG. 1, certain ones of which become active and others of which remain inactive in accordance with the position of the character within the space. The zones in the detection unit are coupled to a vector generating unit 46 which calculates orthogonal vectors such as those shown in FIG. 5 extending from the active zones to the inactive zones. Outputs from the vector generating unit appear on conductors designated collectively as 48 representing the vectors for the particular function applied to the detection unit.

Figure 7:
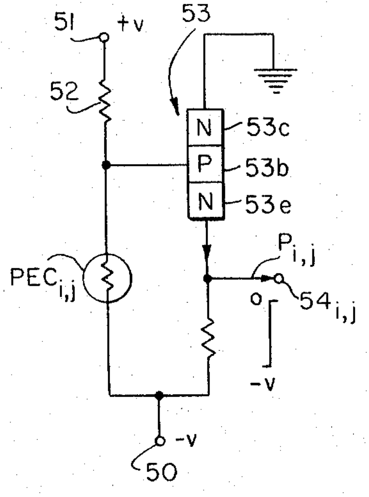
FIG. 7 is a circuit diagram of a typical photocell arrangement constituting a zone $P_{i,j}$.

*Detection unit 44.*—Each of the zones in the detection unit 44 may consist of a circuit such as that shown in FIG. 7. Referring to that figure, a photocell $PEC_{i,j}$ corresponds to the zone $P_{i,j}$. A plurality of such photocells is positioned as shown in FIG. 1, for example, to form a matrix of photocells illuminated by a suitable source of light (not shown). The photocell $PEC_{i,j}$ is connected to a source of negative potential ($-v$-volts) supplied to a terminal 50, as well as to a positive potential ($+v$-volts) supplied to a terminal 51 through a resistor 52. A transistor 53 provides current amplification to drive output terminal $54_{i,j}$. A common potential (ground) supplied to collector 53*c* of transistor 53 is the current source. Emitter 53*e* follows base 53*b* in potential very closely in the range from $-v$ to ground under the control of the photocell $PEC_{i,j}$.

When the photocell $PEC_{i,j}$ is illuminated, it becomes conductive, lowering its resistance and effectively coupling the source of negative potential from the terminal 50 to the base 53*b* to produce a negative signal at the output terminal $54_{i,j}$. When the photocell is not illuminated, i.e., when it is covered by a portion of a symbol to be characterized, it becomes nonconductive and of a high resistance with respect to the resistor 52. In this case, the potential of the output terminal $54_{i,j}$ is effectively equal to the ground potential.

It will be noted, then, that the potential of the output terminal $54_{i,j}$ is either negative or zero, depending upon whether the photocell is conductive (not covered) or nonconductive (covered). In terms of the matrix shown in FIG. 5 and the alphabetic symbol B therein, a nonconductive photocell (0 volts output signal) represents an active zone, while a conductive photocell ($-v$ volts output signal) represents an inactive zone. This, as was pointed out above, is completely arbitrary.

The photocell arrangement shown in FIG. 7 is only one of a number of arrangements which may be utilized to form the detection unit 44 of FIG. 6. The unit may be formed from a scanning tube and suitable memory elements (not shown), to name but one example of an alternative arrangement.

Figure 8:
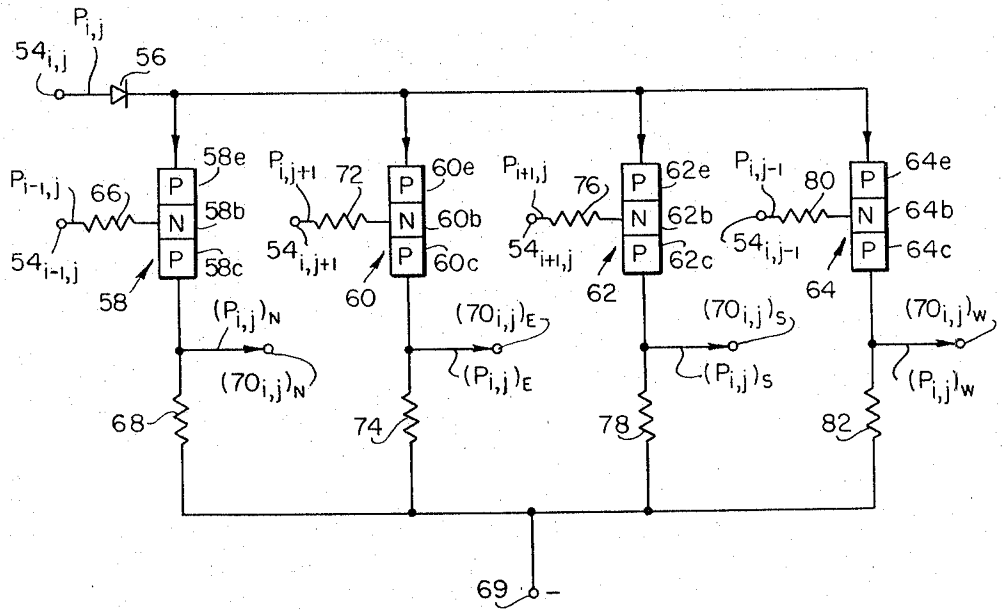
FIG. 8 is a circuit diagram of a typical orthogonal vector generating unit associated with zone $P_{i,j}$.

*Vector generating unit 46.*—FIG. 8 shows a representative circuit associated with each of the zones P and comprises one of *mn* identical units forming the vector generating unit 46 of FIG. 6. The circuit of FIG. 8 carries out Rule 1 and develops for each zone $P_{i,j}$ four output signals, each of which is active (relatively positive) when the zone $P_{i,j}$ is active and a corresponding one of the four surrounding adjacent zones is inactive.

Referring to FIG. 8, the terminal $54_{i,j}$ receives a signal from the same numbered terminal of the associated circuit of FIG. 7. The signal is coupled by a diode 56 to emitters 58*e*, 60*e*, 62*e* and 64*e* of transistors 58, 60, 62 and 64 respectively. Base 58*b* of transistor 58 is coupled through an associated resistor 66 to terminal $54_{i-1,j}$ from a circuit as shown in FIG. 7 associated with the zone $P_{i-1,j}$.

FIG. 3 is helpful in understanding the relationship of the zone $P_{i,j}$ with respect to the zone $P_{i-1,j}$. From that figure, it will be noted that the zone $P_{i-1,j}$ is positioned to the north of the zone $P_{i,j}$.

Referring again to FIG. 8, it is assumed that the signal at the terminal $54_{i,j}$ is at ground potential, representing for the zone $P_{i,j}$ an active state. It is assumed further that the signal at the terminal $54_{i-1,j}$ is of a negative potential, representing for the zone $P_{i-1,j}$ an inactive state. Accordingly, the emitter 58*e* is maintained at a positive potential with respect to the base 58*b* of the transistor 58. Current flows from collector 58*c*, creating a potential drop across collector resistor 68 connected to a source of negative potential applied to a terminal 69 and causing a relatively positive signal to be generated at output terminal $(70_{i,j})_N$. This relatively positive signal represents for the active zone $P_{i,j}$ that the adjacent zone $P_{i-1,j}$ to the north is inactive.

In the event that both the zones $P_{i,j}$ and $P_{i-1,j}$ are in the same state, i.e., they are both active or inactive, the signals applied to the terminals $54_{i,j}$ and $54_{i-1,j}$ are of the same magnitude and polarity. Because of the slight potential drop across the diode 56, the emitter 58*e* of the transistor 58 is maintained at a negative potential with respect to the potential of the base 58*b*. In this case, the transistor is nonconductive and no collector current flows through the collector resistor 68. The signal at the output terminal $(70_{i,j})_N$ is therefore at the relatively negative potential of the terminal 69.

If the zone $P_{i,j}$ is inactive while the zone $P_{i-1,j}$ is active, the signal at the terminal $54_{i,j}$ is negative with respect to the signal at the terminal $54_{i-1,j}$. In this case, the emitter 58*e* is maintained at a negative potential with respect to the base 58*b*, and no collector current flows through the collector resistor 68. This also produces a relatively negative signal at the output terminal $(70_{i,j})_N$.

Accordingly, the signal at the output terminal $(70_{i,j})_N$ is relatively positive and represents a vector such as N in FIG. 3 only when the zone $P_{i,j}$ is active and the adjacent zone $P_{i-1,j}$ to the north is inactive.

The transistors 60, 62 and 64 each act in a fashion similar to the transistor 58 to generate output signals at terminals $(70_{i,j})_E$, $(70_{i,j})_S$ and $(70_{i,j})_W$. Thus emitters 60*e*, 62*e* and 64*e* of the transistors 60, 62 and 64, respectively, are connected to the diode 56. Base 60*b* is coupled through an associated resistor 72 to terminal $54_{i,j+1}$ which receives a signal representative of the state of the zone $P_{i,j+1}$. Collector 60*c* of the transistor 60 is coupled through an associated collector resistor 74 to the terminal 69 which is biased negatively. A relatively positive signal is thus generated at the output terminal $(70_{i,j})_E$ representing a vector such as E in FIG. 3 only if the zone $P_{i,j}$ is active and the adjacent zone $P_{i,j+1}$ to the east is inactive.

For transistor 62, the base 62*b* is coupled through an associated base resistor 76 to terminal $54_{i+1,j}$ which receives a signal representative of the state of the zone $P_{i+1,j}$ to the south of the zone $P_{i,j}$. The collector 62*c* of the transistor is connected through an associated resistor 78 to the biasing terminal 69. A relatively positive output signal is generated at the output terminal $(70_{i,j})_S$ representing a vector such as S in FIG 3 only when the zone $P_{i,j}$ is in the active state and the zone $P_{i+1,j}$ is inactive.

Finally, base 64*b* of transistor 64 is connected through an associated resistor 80 to terminal $54_{i,j-1}$ which receives a signal representative of the state of the zone $P_{i,j-1}$ to the west of the zone $P_{i,j}$. The collector 64*c* of the transistor is connected through an associated resistor 82 to the biasing terminal 69. A relatively positive output signal is generated at the output terminal $(70_{i,j})_W$ representing a vector such as W in FIG. 3 only when the zone $P_{i,j}$ is active and the zone $P_{i,j-1}$ is inactive.

As pointed out above, each of the zones in the detection unit 44 of FIG. 6 has associated therewith a circuit such as shown in FIG. 8 for the generation of four output signals each of which is positive only if the zone is active and a corresponding adjacent zone is inactive. The circuits for all the zones in the detection unit constitute the vector generating unit 46 shown in FIG. 6. The output signals on the conductors 48 of FIG. 6 are those signals appearing at the output terminals $(70_{i,j})_N$, $(70_{i,j})_E$, $(70_{i,j})_S$ and $(70_{i,j})_W$ for each zone $P_{i,j}$. These output signals may be stored in appropriate adaptive memories (not shown) for subsequent handling to aid in the interpretation of the information represented by the signals.

POSITION INVARIANT SPACE TRANSFORMATION

The use of vectors extending from active zones in a space to adjacent inactive zones may also be employed to provide information which is not dependent upon the position or size of a function within the space. This is achieved by treating as output information not the vectors themselves but the sum of all the vectors in the same direction, for each of a plurality of directions. When vectors in the same direction are summed, it is advantageous, in the case of a matrix of zones, to provide vectors that extend in more directions than the four orthogonal directions north, east, south and west. Vector sums for the eight directions north, northeast, east, southeast, south, southwest, west and northwest are suitable, although these directions are merely representative. When these eight vector directions are employed, it has been found that more than sufficient information is provided if the individual vectors extend from active zones to all adjacent inactive zones. To reduce the amount of information provided, in order to aid in further computations, the extension of vectors is limited so that for each active zone a vector is extended to an adjacent inactive zone only in accordance with the following rule:

RULE 2: A vector is drawn from a given active zone to an adjacent inactive zone only if there are two inactive zones on both sides of the adjacent inactive zone which are also adjacent to the given active zone.

Figure 9:
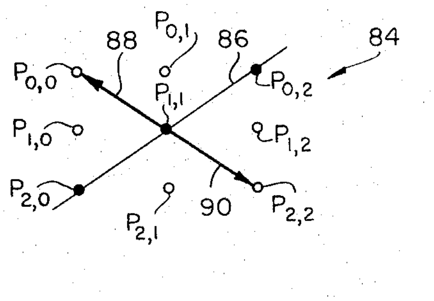
FIG. 9 shows a representative matrix of zones in which a line segment is positioned, and including vectors extending from an active zone to adjacent inactive zones in accordance with a special rule.

FIG. 9 applies Rule 2 to a matrix 84 in which a line segment 86 is positioned, rendering active the zones $P_{2,0}$, $P_{1,1}$ and $P_{0,2}$. Vectors 88 and 90 extend from the zone $P_{1,1}$ to the adjacent zones $P_{0,0}$ and $P_{2,2}$, respectively. For example, the vector 88 may be extended as shown, inasmuch as the inactive zone $P_{0,0}$ to which the vector is extended has inactive zones $P_{1,0}$ and $P_{0,1}$ on both sides thereof which are adjacent to the active zone $P_{1,1}$ from which the vector extends. No other vectors may be extended from the zone $P_{1,1}$ in view of Rule 2. For example, no vector may be extended from the zone to inactive zone $P_{1,2}$ inasmuch as the zone $P_{0,2}$ on one side thereof and adjacent to the active zone $P_{1,1}$ is an active zone.

Figure 10:
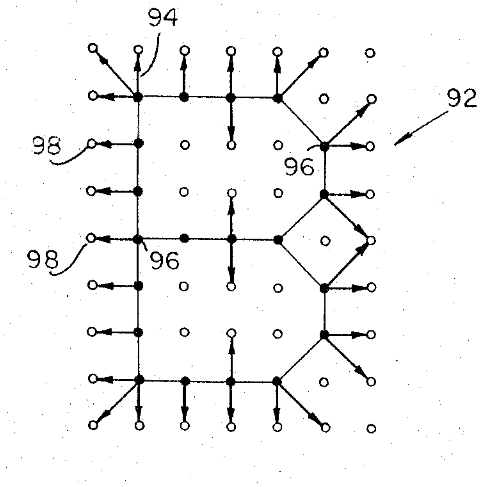
FIG. 10 shows a matrix the same as that of FIG. 2 in which the symbol B is positioned and in which vectors extend from active zones to adjacent inactive zones in accordance with the special rule.

FIG. 10 shows a symbol B positioned in a matrix 92. Vectors 94 which satisfy Rule 2 extend from selected ones of active zones 96 to selected ones of inactive zones 98. If the vectors extending in the same direction are summed, the following table may be prepared for the symbol B.

TABLE 1

| Vector direction: | Sum of vectors |
|---|---|
| N | 6 |
| NE | 3 |
| E | 4 |
| SE | 3 |
| S | 6 |
| SW | 1 |
| W | 7 |
| NW | 1 |

The vector sums characterize the symbol in the matrix, and particularly its edge pattern. It has been found that Rule 2, which limits the number of vectors that may be extended, provides sufficient information to ensure proper characterization of different symbols so that the symbols may be differentiated from each other.

Given the vector sums in each of the chosen directions, it is advantageous to compare each vector sum with all of the others to provide information characterizing a function. The following table gives the comparisons that are made for a matrix such as shown in FIG. 10.

TABLE 2

| Vector sum: | To be compared with vector sums |
|---|---|
| N | NE, E, SE, S, SW, W, NW |
| NE | E, SE, S, SW, W, NW |
| E | SE, S, SW, W, NW |
| SE | S, SW, W, NW |
| S | SW, W, NW |
| SW | W, NW |
| W | NW |

For the symbol B in the matrix of FIG. 10, whose vector sums are as given in Table 1, the comparisons in accordance with Table 2 are as follows:

TABLE 3

| Vector sum: | Vector comparisons |
|---|---|
| N | >NE, >E, >SE, =S, >SW, <W, >NW |
| NE | <E, =SE, <S, >SW, <W, >NW |
| E | >SE, <S, >SW, <W, >NW |
| SE | <S, >SW, <W, >NW |
| S | >SW, <W, >NW |
| SW | <W, =NW |
| W | >NW |

*Overall system—Rule 2.*—The system shown in block diagram form in FIG. 6 is representative of a system for determining the vector sums and comparisons described above. A function to be characterized, designated by the block 42 in the figure, is presented as described previously to the detection unit 44, typically formed from a plurality of zones, such as the zones $$P_{0,0}, P_{1,0} \ldots P_{m,n}$$

shown in FIG. 1. Signals from the detection unit, representative of the states of the zones, are applied to the vector generating unit 46, which in this instance generates signals representative of the vectors determined in accordance with Rule 2 above, such as the vectors 94 shown in FIG. 10. These signals are applied to a common direction vector summation unit 100 which sums all the vectors in a common direction, as in Table 1. Output signals from the unit 100 are applied to a vector sum comparison unit 102, which compares each of the vector sums with every other sum, as in Table 2, to generate output signals on conductors 104 which are useful in the categorization of the function presented to the detection unit 44.

Figure 11:
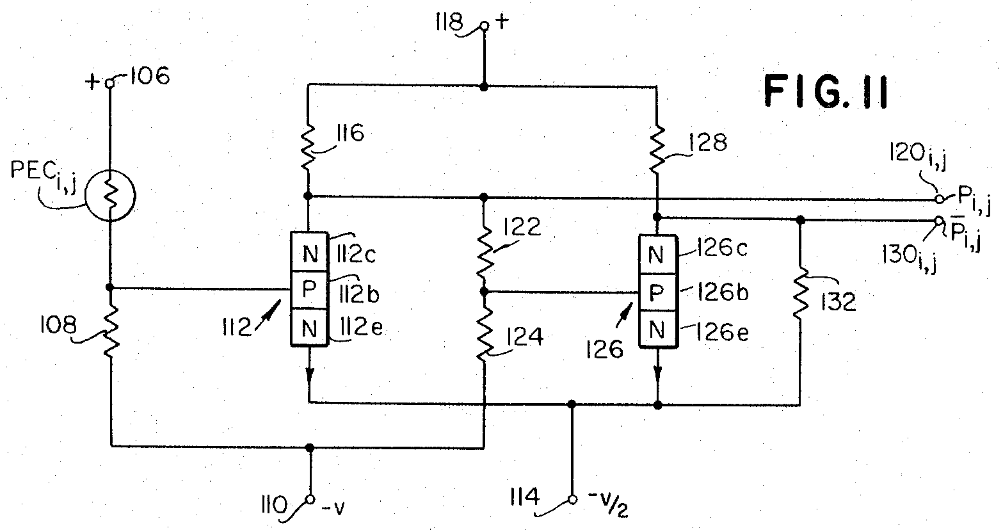
FIG. 11 is a circuit diagram of another typical photocell arrangement constituting a zone in a detection matrix.

*Detection unit 44.*—FIG. 11 shows in detail a representative circuit for instrumenting the detection unit 44 of FIG. 6. The circuit shown is associated with the zone $P_{i,j}$, and there are *mn* of such circuits for a matrix of zones such as shown in FIG. 1. A photocell $PEC_{i,j}$ constitutes the detection element for the zone in the matrix, and is illuminated by a suitable source of light (not shown). The photocell is coupled to a terminal 106 which is supplied with a positive potential. A resistor 108 connects the photocell to a terminal 110 supplied with a negative potential ($-v$ volts). The junction between the resistor 108 and the photocell is connected to base 112*b* of a transistor 112. Emitter 112*e* of the transistor is connected to a terminal 114 which is supplied with a negative potential, $-v/2$ volts, for example. Collector 112*c* of the transistor is connected through a resistor 116 to a terminal 118 supplied with a suitable positive potential.

The collector 112*c* is connected to an output terminal $\mathbf{120}_{i,j}$, as well as to the terminal 110 through resistors 122 and 124. The junction of these latter resistors is connected to base 126*b* of a transistor 126. Emitter 126*e* of the transistor is connected to the terminal 114, while collector 126*c* is connected to the terminal 118 through a resistor 128. The collector 126*c* is also connected to an input terminal $\mathbf{130}_{i,j}$, as well as to the terminal 114 through a resistor 132.

When the zone $P_{i,j}$ is active, e.g., when the photocell $PEC_{i,j}$ is covered by a portion of the function and is nonconductive, the base 112*b* of the transistor 112 is biased negatively with respect to the emitter 112*e*, inasmuch as the potential $-v$ is effectively coupled to the base while the potential of the emitter is $-v/2$. The transistor 112 is thus rendered nonconductive, and therefore virtually no collector current flows through the resistor 116. The potential of the collector 112*c* is roughly equal to the positive potential applied to the terminal 118, and thus a positive signal is generated at the output terminal $\mathbf{120}_{i,j}$.

The relatively high positive potential of the collector 112*c* is coupled through the resistor 122 to the base 126*b* of the transistor 126. The base 126*b* is rendered positive with respect to the emitter 126*e* and the transistor conducts, causing a relatively large potential drop across the resistor 128. This potential drop produces a relatively negative potential at the output terminal $\mathbf{130}_{i,j}$.

When the zone $P_{i,j}$ is inactive, e.g., when no portion of the function covers the photocell $PEC_{i,j}$ and the photocell is rendered conductive, the base 112*b* of the transistor 112 is biased positively with respect to the emitter 112*e* by the positive potential applied to the terminal 106. This causes the transistor to conduct, which produces a potential drop across the resistor 116 and a relatively negative potential at the output terminal $\mathbf{120}_{i,j}$. This relatively negative potential is coupled through the resistor 122 to the base 126*b* of the transistor 126, causing the transistor to be nonconductive. The potential of the collector 126*c* rises roughly to the potential of the terminal 118, producing a relatively positive signal at the output terminal $\mathbf{130}_{i,j}$.

It will be noted, then, that when the zone $P_{i,j}$ is active, a positive signal is generated at the output terminal $\mathbf{120}_{i,j}$ and a negative output signal is generated at the terminal $\mathbf{130}_{i,j}$. When the zone $P_{i,j}$ is inactive, a negative signal is generated at the terminal $\mathbf{130}_{i,j}$ and a positive signal is generated at the terminal $\mathbf{130}_{i,j}$. The signals at the terminals $\mathbf{120}_{i,j}$ and $\mathbf{130}_{i,j}$ are designated $P_{i,j}$ and $\overline{P}_{i,j}$, respectively.

Figure 12:
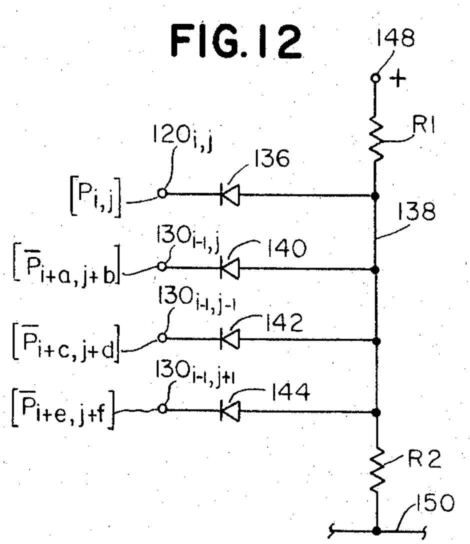
FIG. 12 is a diagram of a typical vector generating circuit for applying the special rule to each of the zones constituted by circuits each such as shown in FIG. 11.

*Vector generating unit 46.*—FIG. 12 shows in detail a representative circuit for instrumenting the vector generating unit 46 of FIG. 6. The circuit is associated with the zone $P_{i,j}$ and carries out Rule 2 above to generate a signal representative of a vector from the zone, such as one of the vectors 94 shown in FIG. 10. Inasmuch as there are eight possible vectors for the zone and *mn* zones in a matrix such as shown in FIG. 1, the number of circuits of the type shown in FIG. 12 required for the entire matrix is 8 *mn*.

FIG. 12 is best explained with reference to FIG. 13 which shows a portion of a matrix in which a zone $P_{i,j}$ is surrounded by eight adjacent zones. For the purpose of illustration, the northerly vector from the zone $P_{i,j}$ to the adjacent zone $P_{i-1,j}$ will be considered. As required by Rule 2 above, such a vector may be extended from the zone $P_{i,j}$ if the following conditions are met:

(1) Zone $P_{i,j}$ is active;

(2) Zone $P_{i-1,j}$ is inactive;

(3) Zones $P_{i-1,j-1}$ and $P_{i-1,j+1}$ are inactive.

The circuit of FIG. 12 generates an output signal only if the above three conditions are met. Referring to that figure, and also considering FIG. 13, a terminal $\mathbf{120}_{i,j}$, which corresponds to the same numbered terminal of the circuit of FIG. 11 for the zone $P_{i,j}$, is connected through a diode 136 to a conductor 138. A terminal $\mathbf{130}_{i-1,j}$, corresponding to the same numbered terminal of a circuit the same as that shown in FIG. 11 for the zone $P_{i-1,j}$, is coupled through a diode 140 to the conductor 138. A terminal $\mathbf{130}_{i-1,j-1}$, corresponding to the same numbered terminal in a circuit the same as that shown in FIG. 11 for the zone $P_{i-1,j-1}$, is coupled through a diode 142 to the conductor 138. A terminal $\mathbf{130}_{i-1,j+1}$, corresponding to the same numbered terminal in a circuit the same as that shown in FIG. 11 for the zone $P_{i-1,j+1}$, is coupled through a diode 144 to the conductor 138. The conductor 138 is connected through a resistor R1 to a terminal 148 which is supplied with a positive potential. The conductor 138 is also coupled to a common electrical conductor 150 through a resistor R2.

If the zone $P_{i,j}$ is active, the potential of the terminal $\mathbf{120}_{i,j}$ is positive, as explained above with regard to the circuit of FIG. 11, which causes the diode 136 to be open-circuited. If the zones $P_{i-1,j}$, $P_{i-1,j-1}$ and $P_{i-1,j+1}$ are inactive, the terminals $\mathbf{130}_{i-1,j}$, $\mathbf{130}_{i-1,j-1}$ and $\mathbf{130}_{i-1,j+1}$ are also positive, causing the diodes 140, 142 and 144 to be open-circuited. Accordingly, the positive potential from the terminal 148 is coupled to the conductor 150 through the resistors R1 and R2.

Rule 2 is not satisfied if the zone $P_{i,j}$ is inactive. In this event, the terminal $\mathbf{120}_{i,j}$ is of a negative potential, which causes the diode 136 to conduct, bypassing the resistor R1 and applying the negative potential of the terminal $\mathbf{120}_{i,j}$ to the conductor 138.

Rule 2 is also not satisfied if any one of the zones $P_{i-1,j}$, $P_{i-1,j-1}$ and $P_{i-1,j+1}$ is inactive. If any one of these conditions is met, the associated one of the terminals $\mathbf{130}_{i-1,j}$, $\mathbf{130}_{i-1,j-1}$ and $\mathbf{130}_{i-1,j+1}$ is at a negative potential, causing the associated one of the diodes 140, 142 and 144 to conduct, thereby driving the conductor 138 to a negative potential.

It is obvious that the positive potential of the terminal 148 is coupled to the conductor 150 through the resistors R1 and R2 if Rule 2 is satisfied for the zone $P_{i,j}$ regarding the northerly vector from the zone, i.e., if the zone $P_{i,j}$ is active and the zones $P_{i-1,j}$, $P_{i-1,j-1}$ and $P_{i-1,j+1}$ are inactive.

FIG. 12 has been described with reference to the generation of a northerly vector from the zone $P_{i,j}$. As noted above, seven other vectors are involved for each zone $P_{i,j}$ for the eight vector directions assumed for the matrix of FIG. 13. Each of these vectors extends from the zone $P_{i,j}$ to a different one of the surrounding zones shown in the figure. There are thus a total of eight circuits associated with each zone $P_{i,j}$, each circuit being the same as that shown in FIG. 12 to generate signals representative of these vectors. The connections for these circuits are given in the following table.

input terminal in FIG. 12 receives a signal $P_{i,j}$ which is positive when the zone $P_{i,j}$ is active and which is negative when the zone is inactive. The next lower input terminal receives a signal $\overline{P}_{i+a,j+b}$. The values of *a* and *b* are determined from Table 4 for each of the eight vectors. For example, in the determination of the southeast vector, the values of *a* and *b* are each 1. In this case, the signal applied to the diode 140 is $\overline{P}_{i+1,j+1}$, representative of the state of the zone $P_{i+1,j+1}$. This signal is negative if the zone is active and is positive if the zone is inactive.

Similarly, the input terminal coupled to the diode 142 receives a signal $\overline{P}_{i+c,j+d}$, wherein *c* and *d* are each given in Table 4 for each of the eight vectors. Taking the southeast vector as an example, the values of *c* and *d* are 0 and 1, respectively. In this case, the signal applied to the diode 142 is $\overline{P}_{i,j+1}$, representative of the state of the zone $P_{i,j+1}$. The signal is negative if the zone is active and is positive if the zone is inactive.

The input terminal connected to the diode 144 receives a signal $P_{i+e,j+f}$, wherein *e* and *f* are given in Table 4 for each of the eight vectors. Taking the southeast vector as an example, the values of *e* and *f* are 1 and 0, respectively. In this case, the signal applied to the diode 144 is $\overline{P}_{i+1,j}$, representative of the state of the zone $P_{i+1,j}$. The signal is negative if the zone is active and is positive if the zone is inactive.

Figure 14:
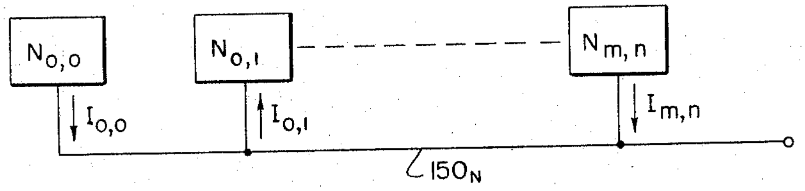
FIG. 14 is a block diagram of the interconnection of circuits each of which may take the form as that shown in FIG. 12 for summing vectors of a common direction.

*Common direction vector summation unit 100*.—As noted above, all the vectors which extend in the same direction are summed to provide a single signal representative of the total number of such vectors. To this end, a circuit arrangement such as that shown in FIG. 14 is employed. This figure shows how the sum for all the vectors in a single direction is computed, such as the sum of the northerly extending vectors.

Referring to FIG. 14, the boxes designated $N_{0,0}$, $N_{0,1}$ . . . $N_{m,n}$ each represent a circuit as shown in FIG. 12 for generating the northerly vectors for the zones $P_{0,0}$, $P_{0,1}$ . . . $P_{m,n}$. Each of the boxes is coupled to a common conductor $\mathbf{150}_N$. As explained above with reference to FIG. 12, if Rule 2 is satisfied for a zone, the positive potential applied to the terminal 148 is coupled to the

TABLE 4

| Vector | Vector From | Vector To | Adjacent Side Zones | *a* | *b* | *c* | *d* | *e* | *f* |
|---|---|---|---|---|---|---|---|---|---|
| N | $P_{i,j}$ | $P_{i-1,j}$ | $P_{i-1,j-1}$ and $P_{i-1,j+1}$ | −1 | 0 | −1 | −1 | −1 | 1 |
| NE | $P_{i,j}$ | $P_{i-1,j+1}$ | $P_{i-1,j}$ and $P_{i,j+1}$ | −1 | 1 | −1 | 0 | 0 | 1 |
| E | $P_{i,j}$ | $P_{i,j+1}$ | $P_{i-1,j+1}$ and $P_{i+1,j+1}$ | 0 | 1 | −1 | 1 | 1 | 1 |
| SE | $P_{i,j}$ | $P_{i+1,j+1}$ | $P_{i,j+1}$ and $P_{i+1,j}$ | 1 | 1 | 0 | 1 | 1 | 0 |
| S | $P_{i,j}$ | $P_{i+1,j}$ | $P_{i+1,j+1}$ and $P_{i+1,j-1}$ | 0 | 0 | 1 | 1 | 1 | −1 |
| SW | $P_{i,j}$ | $P_{i+1,j-1}$ | $P_{i+1,j}$ and $P_{i,j-1}$ | 1 | −1 | 1 | 0 | 0 | −1 |
| W | $P_{i,j}$ | $P_{i,j-1}$ | $P_{i+1,j-1}$ and $P_{i-1,j-1}$ | 0 | −1 | 1 | −1 | −1 | −1 |
| NW | $P_{i,j}$ | $P_{i-1,j-1}$ | $P_{i,j-1}$ and $P_{i-1,j}$ | −1 | −1 | 0 | −1 | −1 | 0 |

Figure 13:
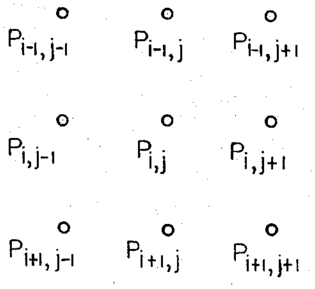
FIG. 13 shows a typical matrix formed from nine zones.

Table 4 is to be read in conjunction with FIGS. 12 and 13. The first column of the table tabulates the vector directions from the zone $P_{i,j}$. The second column in the table indicates that the vector extends from this zone. The third column in the table designates to which of the surrounding zones the vector from the zone $P_{i,j}$ is extended if the conditions of Rule 2 are satisfied. For example, the southeast vector from the zone $P_{i,j}$ extends to the zone $P_{i+1,j+1}$. The fourth column gives the adjacent side zones pertinent to the decision of whether or not a vector may be extended. For example, in the determination of the southeast vector from the zone $P_{i,j}$, the adjacent side zones are $P_{i,j+1}$ and $P_{i+1,j}$.

Referring to FIG. 12, the input terminals connected to the diodes 136, 140, 142 and 144 are designated by expressions in brackets. These expressions designate the signals applied to the terminals from the corresponding circuits each the same as that shown in FIG. 11 associated with the corresponding zone. Thus, the uppermost conductor $\mathbf{150}_N$ through the resistors R1 and R2. If the rule is not satisfied, the conductor $\mathbf{150}_N$ is coupled through the resistor R2 to a source of negative potential, i.e., to the source of −v/2 volts applied to the terminal 114 of FIG. 11 through one of the conducting transistors 112 and 126.

Accordingly, those of the boxes $N_{0,0}$, $N_{0,1}$ . . . $N_{m,n}$ in FIG. 14 representing northerly vectors cause currents such as those designated $I_{0,0}$ and $I_{m,n}$ to flow as indicated by the arrows in the figure. Others of the boxes, such as that designated $N_{0,1}$, represent zones for which Rule 2 is not satisfied and in each of which one or more of the diodes 136, 140, 142 and 144 (FIG. 12) are conductive, coupling the resistor R2 of the circuit to the source of negative potential. These boxes constitute paths for the currents such as $I_{0,0}$ and $I_{m,n}$ to flow. Accordingly, the potential of the common conductor $\mathbf{150}_N$ is determined by the sum of the currents such as $I_{0,0}$ and $I_{m,n}$, i.e., the sum of the vectors in a given direction for all zones.

Eight circuit arrangements the same as that shown in FIG. 14 are employed for the summation of the north, northeast, east, southeast, south, southwest, west and northwest vectors.

Figure 15:
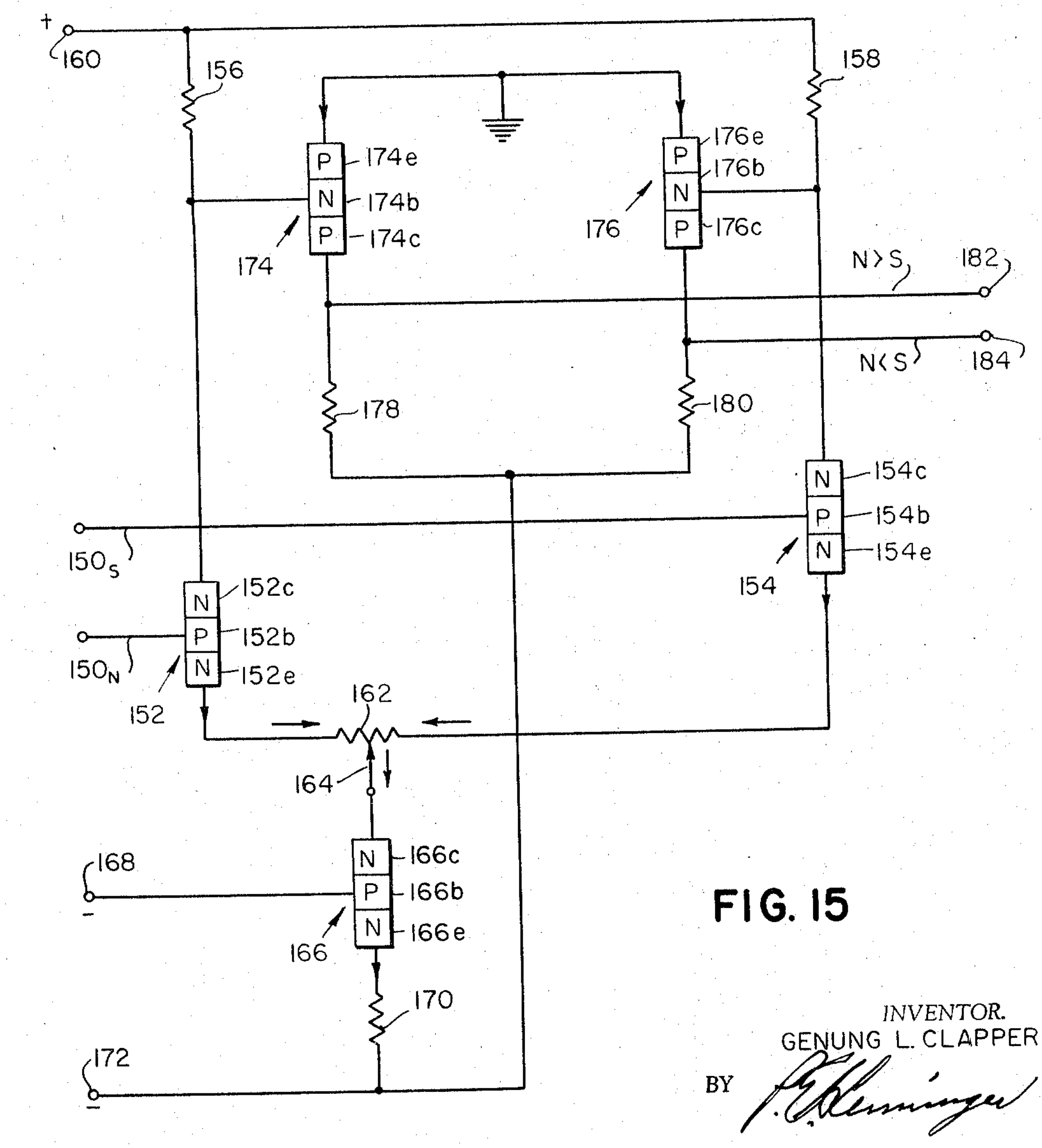
FIG. 15 is a diagram of a circuit useful in the invention for comparing signals representative of different directional vector sums.

*Vector sum comparison unit 102.*—As pointed out above, the invention provides for the comparison of all vector sums, as given in Table 2 above. FIG. 15 shows a typical circuit for carrying out one of the comparisons, such as that between the north vector sum and the south vector sum. Signals representing these vector sums are carried on conductors $150_N$ and $150_S$ coupled to bases **152*b* and 154*b* of transistors 152 and 154, respectively. Collectors 152*c* and 154*c* are coupled through associated resistors 156 and 158 to a terminal 160 supplied with a positive potential. Emitters 152*e* and 154*e* are connected to opposite ends of a potentiometer 162, the movable contact 164 of which is connected to collector 166*c* of transistor 166. Base 166*b* of the transistor is connected to a terminal 168 supplied with a negative potential. Emitter 166*e* of the transistor is connected through a resistor 170 to a terminal 172** also supplied with a negative potential.

The collectors **152*c* and 154*c* of the transistors 152 and 154 are also connected to bases 174*b* and 176*b* of transistors 174 and 176, respectively. Emitters 174*e* and 176*e* are connected to a source of common potential, such as ground, while collectors 174*c* and 176*c* are connected to the terminal 172 through collector resistors 178 and 180**, respectively.

The transistor 166 comprises a constant current generator, the current flow to the collector **166*c* of which is determined by the negative potential of terminal 168 with respect to that of the terminal 172, as well as by the resistance of resistor 170. The potentiometer 164 serves as a current divider so that the currents flowing from the emitters 152*e* and 154*e* of the transistors 152 and 154** are equal when the inputs $150_S$ and $150_N$ are at the same potential.

To explain the operation of the circuit, assume that the signal on the conductor $150_N$ is more positive than the signal on the conductor $150_S$, indicating that the sum of the north vectors is greater than the sum of the south vectors. The forward bias between the emitter and base of the transistor 152 is thus greater than the forward bias between the emitter and base of the transistor 154, causing the transistor 152 to conduct more heavily than the transistor 154. This causes the current to the collector **152*c* to increase, thereby increasing the potential drop across the resistor 156 and rendering more negative the potential of the base 174*b* of the transistor 174. This action increases the forward bias between the emitter and base of the transistor 174, thereby increasing the current flow from the collector 174*c* and rendering the potential of the collector more positive. Accordingly, a positive signal is generated at output terminal 182** which is coupled to the collector.

Concurrently with the increase in conduction in the transistor 152, the conduction of the transistor 154 decreases to maintain the constant flow of current to the transistor 166. The decrease in current flow to the collector **154*c* of the transistor produces a corresponding decrease in the potential drop across the resistor 158, rendering the potential of the base 176*b* of the transistor 176 more positive, and thereby decreasing the forward bias between the emitter and the base of the transistor. This decreases the conduction of the transistor and the current flowing from the collector 176. Accordingly, the potential of the collector is driven more negative, and this is reflected in a negative output signal appearing at a terminal 184** connected to the collector.

It will be noted, then, that when the sum of the north vectors is greater than the sum of the south vectors, the potential of the terminal 182 is positive while that of the terminal 184 is negative. If the sum of the north vectors is less than the sum of the south vectors, the potential of the terminal 182 is negative while the potential at the terminal 184 is positive.

The adjustment of the constant current flow to the transistor 166 mentioned above permits the transistors 174 and 176 to be adjusted to cut-off or to a particular degree of conduction for equal signals applied to the conductors $150_N$ and $150_S$, depending upon the nature of the output signals required for the system.

Circuits the same as that shown in FIG. 15 are employed to carry out the comparisons of Table 2 above.

WEIGHTED VECTORS

The arrangements described above employ signals representative of vectors all assumed to be of the same magnitude. It may be advantageous, however, to weight the vectors depending upon the positions of the vectors within the space. For example, it will be noted that the numerical symbols 6 and 9 are similar in shape, differing only by orientation. The common directional vector sums for each of these symbols may provide information difficult to distinguish. To aid in distinguishing these and other similar symbols in a recognition process, it is contemplated that the vectors wthin the space be weighted in accordance with their spatial positions. This is achieved as follows.

Taking the matrix of FIG. 1 as an example, it is assumed that the vectors are to be weighted according to row (0, 1 . . . *m*) employing a gradient *g*. The weighting of each row is determined by multiplying the weight of the previous row by the gradient. Thus in the matrix of *m* rows shown in FIG. 1, the following table may be prepared designating the weighting according to row:

TABLE 5

| Row | Weight (Orthogonal Vectors) | Weight (Diagonal Vectors) |
|---|---|---|
| 0 | 1 | $\sqrt{2}$ |
| 1 | g | $g\sqrt{2}$ |
| 2 | $g^2$ | $g^2\sqrt{2}$ |
| 3 | $g^3$ | $g^3\sqrt{2}$ |
| . | . | . |
| . | . | . |
| . | . | . |
| m | $g^m$ | $g^m\sqrt{2}$ |

It will be noted from Table 5 that the weight of a diagonal vector is the same as the weight of the orthogonal vector for the same row multiplied by $\sqrt{2}$. This accounts for the increased vector length of the diagonal vector, which is apparent from FIG. 10.

The weighting of the vectors may be accomplished by suitable vairation of the resistors R1 and R2 for the circuits, each the same as the circuit of FIG. 12, corresponding to different rows in the matrix. The following table designates the variation of resistor values in terms of the sum of the resistances of R1 and R2 according to row.

TABLE 6

| Row: | R1+R2 |
|---|---|
| 0 | $r$ |
| 1 | $r/g$ |
| 2 | $r/g^2$ |
| 3 | $r/g^3$ |
| . | . |
| . | . |
| . | . |
| *m* | $r/g^m$ |

In the above table, the resistance *r* is assumed to be the unit resistance to which the gradient *g* is applied. This resistance is divided by $g$, $g^2$, $g^3$ . . . $g^m$, inasmuch as the current flow through each pair of resistors R1 and R2 giving rise to the vector signal is inversely proportional to the sum of the magnitudes of the resistors.

It will be appreciated that in actual practice it may be difficult to obtain resistor values which increase exactly according to the progression given in Table 6. Approximate values for the resistances will suffice, of course.

It will be noted further that the value of R2 may be made constant for all zones in a row, the difference in weights for orthogonal and diagonal vectors being accomplished by a difference in the values of R1 for these vectors. In this fashion, in a circuit such as shown in FIG. 14 formed from a plurality of circuits as in FIG. 12, the parallel resistances to the negative source of potential (terminal 114 of FIG. 11) are of equal resistors R2 for diagonal as well as orthogonal vector circuits.

SUMMARY

It will be noted that various systems have been described for the derivation of vector information regarding zones in a space. For a plane space formed from a matrix of zones, a system for deriving orthogonal vectors has been provided, as well as a system for deriving orthogonal and diagonal vectors, all in accordance with appropriate rules for the extension of vectors from active zones to adjacent inactive zones. The summation of vectors in common directions has been provided to generate information which is not dependent upon the size and position of a function within the space determining the states of the zones.

Although the preferred embodiments disclosed have been directed mainly toward plane spaces, the invention has application to spaces of all dimensions. Further, while the invention has been particularly shown and described with reference to such preferred embodiments, it will be understood by those skilled in the art that various changes in form and details may be made without departing from the spirit and scope of the invention.

Accordingly, the invention should be taken to be defined by the following claims:

What is claimed is:

1. In apparatus for generating signals representative of the distribution of active and inactive zones in a space, the combination of detector means for sensing the states of the zones, and comparing means responsive to the detector means for comparing each zone with selected adjacent zones, said comparing means including means for generating, for each zone sensed as active a signal for each of the selected adjacent compared zones which is sensed as inactive.

2. Apparatus as recited in claim 1, including means for weighting the output signals generated in accordance with the relative positions of the zones in the space.

3. Apparatus as recited in claim 1, wherein the signal generating means generates, for each of the zones sensed as active, output signals corresponding only to those zones of adjacent compared zones sensed as inactive that are bracketed on both sides thereof by zones sensed as inactive.

4. Apparatus as recited in claim 1, including means for combining the output signals for all sets of compared zones in which adjacent active and inactive zones lie in the same direction from each other.

5. Apparatus as recited in claim 4, including means for comparing the combined signals with respect to each other to generate a plurality of further output signals.

6. In apparatus for generating signals representative of the states of active and inactive $x$ zones in a space, wherein the zones in the space are positioned in an orthogonal matrix as follows, with each zone $x$ being designated by the letter P having two subscripts, the first subscript designating the horizontal row of the matrix in which the zone is located and the second subscript designating the vertical column of the matrix in which the zone is located:

$$xP_{0,0}xP_{0,1} \cdot\cdot xP_{0,n}$$

$$x_{1,0}xP_{1,1} \cdot\cdot xP_{1,n}$$

$$\cdot \quad \cdot \quad \cdot$$

$$\cdot \quad \cdot \quad \cdot$$

$$xP_{m,0}xP_{m,1} \cdot\cdot xP_{m,n}$$

the combination of means for sensing the states of the zones, means for comparing the state of each zone $P_{i,j}$ with the states of surrounding zones, the comparing means including means for generating an output signal for each pair of compared zones only when the zone $P_{i,j}$ is sensed as active and the other zone is sensed as inactive.

7. Apparatus as recited in claim 6, wherein the comparing means compares the state of each zone $P_{i,j}$ with the state of each of the zones $P_{i-1,j}$, $P_{i,j+1}$, $P_{i+1,j}$ and $P_{i,j-1}$.

8. Apparatus as recited in claim 6, wherein the comparing means compares the state of each zone $P_{i,j}$ with the state of an adjacent zone and two zones on both sides of the adjacent zone which are also adjacent to the zone $P_{i,j}$, and wherein the output signal is generated if the zone $P_{i,j}$ is sensed as active and the three adjacent zones are sensed as inactive.

9. Apparatus as recited in claim 6, wherein the comparing means compares the state of each zone $P_{i,j}$ separately with the state of each of the eight adjacent zones $P_{i-1,j}$, $P_{i-1,j+1}$, $P_{i,j+1}$, $P_{i+1,j+1}$, $P_{i+1,j}$, $P_{i+1,j-1}$, $P_{i,j-1}$ and $P_{i-1,j-1}$, and wherein the comparing means also compare the state of the two bracketing zones on both sides of each adjacent zone to generate an output signal for each comparison only if the bracketing zones are also of inactive states, as set forth in the following table:

| Comparison | Zone Sensed Active | Adjacent Zone Sensed Inactive | Bracketing Zones Sensed Inactive |
|---|---|---|---|
| 1 | $P_{i,j}$ | $P_{i-1,j}$ | $P_{i-1,j-1}$, $P_{i-1,j+1}$ |
| 2 | $P_{i,j}$ | $P_{i-1,j+1}$ | $P_{i-1,j}$, $P_{i,j+1}$ |
| 3 | $P_{i,j}$ | $P_{i,j+1}$ | $P_{i-1,j+1}$, $P_{i+1,j+1}$ |
| 4 | $P_{i,j}$ | $P_{i+1,j+1}$ | $P_{i,j+1}$, $P_{i+1,j}$ |
| 5 | $P_{i,j}$ | $P_{i+1,j}$ | $P_{i+1,j+1}$, $P_{i+1,j-1}$ |
| 6 | $P_{i,j}$ | $P_{i+1,j-1}$ | $P_{i+1,j}$, $P_{i,j-1}$ |
| 7 | $P_{i,j}$ | $P_{i,j-1}$ | $P_{i+1,j-1}$, $P_{i-1,j-1}$ |
| 8 | $P_{i,j}$ | $P_{i-1,j-1}$ | $P_{i,j-1}$, $P_{i-1,j}$ |

10. Apparatus as recited in claim 6, including means for weighting the output signals in accordance with the relative positions of the zones in the space.

11. Apparatus as recited in claim 10, wherein the means for weighting the output signals weights the signals by row according to the row of the active zone generally in accordance with the following table:

| Row: | Weight |
|---|---|
| 0 | 1 |
| 1 | $g$ |
| 2 | $g^2$ |
| 3 | $g^3$ |
| . | . |
| . | . |
| . | . |
| . | . |
| $m$ | $g^m$ |

wherein $g$ represents the weighting gradient, with the weight for each row being determined by multiplying the weight of the previous row by the gradient.

12. Apparatus as recited in claim 11, wherein the weighting means weights signals representing compared zones orthogonally positioned with respect to each other in accordance with the table, and the weighting means weights signals representing compared zones diagonally positioned with respect to each other by a factor equal to the gradient for the row of the active zone multiplied by $\sqrt{2}$.

13. Apparatus as recited in claim 6, including means for adding together all the output signals generated representative of compared zones which lie in the same direction from each other.

14. Apparatus as recited in claim 13, including means for comparing the added signals representative of different directions with respect to each other to generate a plurality of further output signals.

References Cited by the Examiner

UNITED STATES PATENTS

| | | | |
|---|---|---|---|
| 3,064,519 | 11/1962 | Shelton | 340—146.3 |
| 3,104,369 | 9/1963 | Rabinow | 340—146.3 |

OTHER REFERENCES

Horowitz and Shelton: Pattern Recognition Using Autocorrelation, Proceedings of the I.R.E., 1961, pp. 175–185.

Bomba, J. L.: Alpha-Numeric Character Recognition Using Local Operations, Proceedings of the Eastern Joint Computer Conference, 1959, pp. 218–224.

Bledsoe and Browning: Pattern Recognition and Reading by Machine, Proceedings of the Eastern Joint Computer Conference, 1959, pp. 225–232.

Sherman, H.: A Quasi-Topological Method for the Recognition of Line Patterns, Proceedings of the International Conference on Information Processing, Unesco, June 15–20, 1959, pp. 232–238.

Grimsdale et al.: "A System for the Automatic Recognition of Patterns," The Inst. of Elect. Engrs., Paper No. 2792 M, December 1958, pp. 210–221.

Unger S. H.: "Pattern Detection & Recognition" by Proc. of I.R.E., October 1959, pp. 1737–1751.

Kamentsky: "Pattern & Character Recognition Systems," 1959, W.J.C.C., pp. 304–309.

MAYNARD R. WILBUR, *Primary Examiner.*

MALCOLM A. MORRISON, *Examiner.*

J. E. SMITH, J. S. IANDIORIO, *Assistant Examiners.*